US008397661B2

(12) United States Patent
Belanger et al.

(10) Patent No.: US 8,397,661 B2
(45) Date of Patent: Mar. 19, 2013

(54) TIRE TREATMENT DEVICE WITH SHOCK ABSORPTION AND VEHICLE MISALIGNMENT TOLERANCE

(75) Inventors: Michael J. Belanger, Novi, MI (US); David L. Tognetti, Howell, MI (US); Mark D. Morin, Plymouth, MI (US); Marshall L. Hinson, Redford, MI (US)

(73) Assignee: Belanger, Inc., Northville, MI (US)

( * ) Notice: Subject to any disclaimer, the term of this patent is extended or adjusted under 35 U.S.C. 154(b) by 938 days.

(21) Appl. No.: 12/490,453

(22) Filed: Jun. 24, 2009

(65) Prior Publication Data

US 2010/0326467 A1 Dec. 30, 2010

(51) Int. Cl.
*B05C 1/08* (2006.01)

(52) U.S. Cl. ........... 118/256; 118/264; 15/230.14; 15/53.4; 15/97.3; 15/103.5; 134/45; 134/123

(58) Field of Classification Search ............ 118/256, 118/264; 15/230.14, 53.4, 97.3, 97.1, 103.5; 134/45, 123
See application file for complete search history.

(56) References Cited

U.S. PATENT DOCUMENTS

| 4,192,036 | A | 3/1980 | Heymann |
| 5,125,981 | A * | 6/1992 | Belanger et al. ............ 134/18 |
| 5,127,123 | A | 7/1992 | Belanger |
| 6,461,429 | B1 | 10/2002 | Gorra |
| 6,461,685 | B2 | 10/2002 | Gorra |
| 6,936,104 | B2 | 8/2005 | Gorra |
| 2009/0194020 | A1 * | 8/2009 | Ennis ............................ 118/256 |
| 2009/0211605 | A1 * | 8/2009 | Ahmad .......................... 134/18 |

* cited by examiner

*Primary Examiner* — Laura Edwards
(74) *Attorney, Agent, or Firm* — Young Basile Hanlon & MacFarlane PC

(57) ABSTRACT

A tire dressing applicator station for use in car wash installations wherein the applicators are tolerant of large degrees of vehicle misalignment, misorientation and entry contact shock. In each applicator structure, an additional pivot or "knuckle" is placed in one of two support arms which are pivotally connected between floor anchors and an elongate mounting carriage to which the dressing applicator elements are attached. Flared tire guides are located on the entry ends of the applicator structures to make contact with the tires of approaching vehicles whereby one or both of the two applicator structures is/are reoriented as necessary to accommodate the actual location of the vehicle, whether it be on the intended path of travel or off to one side and/or angularly misoriented relative to the intended path of vehicle travel.

5 Claims, 3 Drawing Sheets

TIRE TREATMENT DEVICE WITH SHOCK ABSORPTION AND VEHICLE MISALIGNMENT TOLERANCE

FIELD OF THE INVENTION

This invention relates to automatic vehicle treatment stations of the type found in commercial car washes and more particularly to a tire or wheel treatment device which absorbs shock forces due to vehicle entry and is tolerant of vehicle misalignment during treatment.

BACKGROUND OF THE INVENTION

In pending application U.S. patent application Ser. No. 12/062,996 filed Apr. 4, 2008 and assigned to Belanger, Inc. of Northville, Mich., there is described a system for effectively applying dressing, such as Armor All®, to the sidewalls of the tires on a motor vehicle. The device comprises the combination of two elongate applicator structures arranged in mirror image fashion on opposite sides of a vehicle path of travel. Each structure comprises a linear series of foam plastic applicator rollers arranged on a shaft attached to a carriage supported by a pair of parallelogram arms. These arms are, in turn, attached to anchor plates bolted to the floor of a car wash installation. The parallelogram arms, together with appropriate actuators such as air cylinders, move the applicator structures toward and away from positions in which the rollers can contact the sidewalls of the tires on opposite sides of the vehicle.

The applicator structure described in the aforementioned application, as well as in other related pending applications, is well suited for the treatment of vehicles which properly enter and maintain alignment with the applicator structure as, for example, in a conveyor type car wash. However, as disclosed, the support systems for the aforementioned applicator structures are less suitable for conveyorless, drive-through car wash installations where it is up to the driver of each vehicle to orient and align the vehicle with a designated path of travel while entering and passing through the tire dressing applicator station; i.e., some drivers tend to favor one side of the vehicle over the other while other drivers provide steering inputs which result in undesired changes in vehicle alignment prior to or during a treatment process.

It has been found that either causing the vehicle to enter the station off-center or creating a misalignment between the longitudinal axis of the vehicle and the desired center line of the treatment station can cause poor results in the treatment process and/or damage to the equipment in the car wash. This is because the support system for the treatment station as shown in the aforementioned application, is not tolerant of high degrees of off-center entry or travel and/or misalignment.

BRIEF SUMMARY OF THE INVENTION

Our invention, as described herein, is a treatment station such as, but not limited to, a wheel dressing applicator, with the advantage of being highly tolerant of off-center and misaligned vehicles by virtue of the fact that the support systems for a generally linear treatment device, such as a tire dressing applicator, allows a large degree of angular reorientation of each of the two opposing structures prior to and during the treatment process. Although this can be achieved in a variety of ways, some of which are hereinafter described, we have found that the preferred embodiment of our invention includes the introduction of an additional pivot joint into one of the two aforementioned parallelogram arms which support and move the treatment device such that the linear orientation of the treatment device can change dynamically to match the orientation or alignment of the vehicle.

In the preferred form, the invention is embodied in a tire dressing applicator system comprising foam plastic dressing applicators mounted on opposite sides of a treatment area and supported by two pivot arms, the outboard ends of which are attached to anchor plates. In the illustrated embodiment, the applicators are made up of a series of foam toroids mounted on a shaft that can be rotated. However, it will be understood from a reading of the following specification that the invention is not limited to tire dressing applicators or to applicators having cylindrical or toroidal rollers, but can also be used in combination with various devices including wheel brushes and applicators of the type having elongate foam pads. We have found that our invention not only accommodates misalignments and off-centered conditions but is also tolerant of vehicles having different track dimensions as between the front and rear axles.

In the preferred embodiment, the applicator system is used in combination with outwardly angled i.e., diverging, vehicle entry guides. The system pre-orients the opposing applicator structures in a mirror-image arrangement in which the entry ends are closer together than the exit ends and the tire guides diverge outwardly to capture the leading edges of the front tires of a vehicle even if that vehicle is seriously misaligned with respect to a centerline designating a preferred entry orientation/position of a vehicle to be treated. A system of cylinders provides resilience in the two structures, whereby initial contact between the leading edge of the tires of the vehicle and the tire guide rails attached to the applicator structures causes the applicator structures to move as necessary to absorb shock and to position the applicators where they will enjoy perfect contact with the sidewalls of a vehicle entering and passing through the treatment station. Limit stops are provided on the structure to prevent excessive flexing and/or angular reorientation. The overall length of the system is such that at least 180° of tire rotation is required to traverse the entire length of the applicator and most vehicles will have both front and rear tires in contact with the applicator pads at the same time for at least a brief portion of the overall tire treatment process.

For a full understanding of the invention and the method and mode of making and operating same, reference should be had to the following specification which describes an illustrative embodiment of our invention in detail.

BRIEF DESCRIPTION OF THE DRAWINGS

The description herein makes reference to the accompanying drawings wherein like reference numerals refer to like parts throughout the several views, and wherein.

DETAILED DESCRIPTION OF THE ILLUSTRATIVE EMBODIMENT

Figure 1:
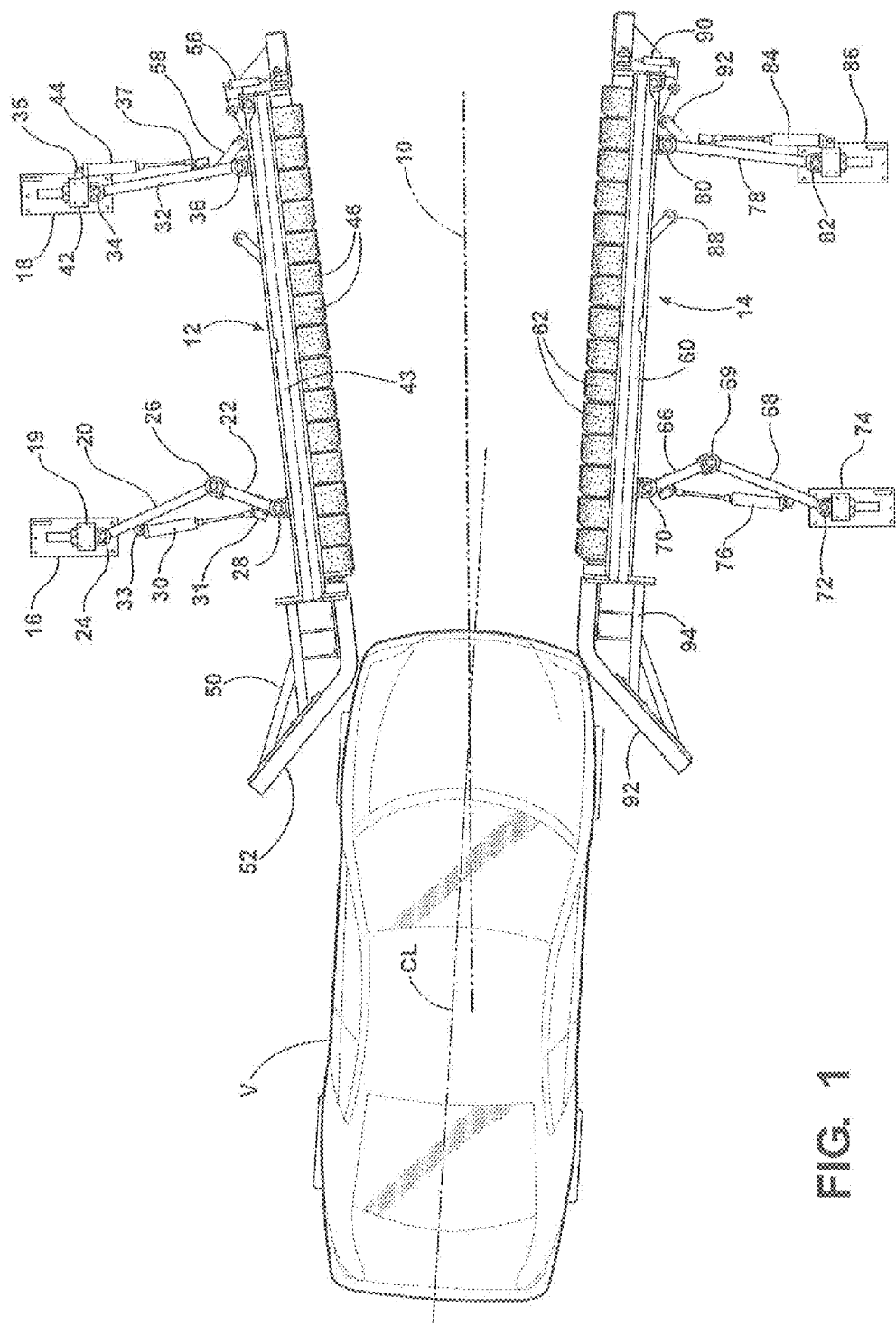
FIG. 1 is a plan view of a tire dressing application station embodying our invention with an off-center vehicle in an entry position.

Referring to FIG. 1, there is shown in plan view a double-sided tire dressing system in which the designated path of travel 10 is shown essentially as a geometric center line between two mirror image applicator structures 12, 14. Describing structure 12 first, it comprises a pair of anchor plates 16, 18 which are bolted to the floor of a car wash installation in parallel spaced relationship. Plate 16 incorporates a standard 19, to which one end of an arm made up of two portions 20, 22 is connected by pivot 24. The other end of the arm portion 20, 22 is connected by a pivot 28 to an elongate carriage 43. A knuckle 26 interconnects the portions 20, 22 to form a collapsible arm which, by virtue of the knuckle 26, can vary in effective length. In the embodiment shown, arm portion 20 is approximately 24¾ inches long from the center of pivot 24 to the center of pivot 26 and arm portion 22 is approximately 13½ inches long from the center of knuckle pivot 26 to the center of pivot 28. An air cylinder acting as a spring and damper 30 is shown connected between a bracket 31 attached to arm 22 and a bracket 33 attached to the arm 20 to maintain the arms in a slightly flexed condition; i.e., with an angle between the intersecting axes of the two arms. The cylinder 30 is effectively connected across the knuckle 26. The length of cylinder 30 does not allow the arm portions 20, 22 to form a straight line as this might cause a lock-up condition.

On the right side of the structure 12 as viewed in FIG. 1 the floor plate 18 is connected to an unbroken arm 32 by way of a pivot 36 at the end nearest the structure and a pivot 34 on the standard 42 which is part of plate 18. The length of arm 32 is approximately 29¾ inches. An air cylinder 44 is connected between a pivot 35 on plate 18 and a bracket 37 on the arm 32.

The structure 12 further comprises a carriage 43 which supports a shaft (not shown) which in turn, supports a series of fifteen 8-inch diameter foam plastic rollers 46 which act as applicators for tire dressing which is applied to the outside surfaces of the applicators 46 through a supply system (not shown). The overall length of the series of rollers 46 is about 9 feet. For a detailed description of the entire dressing application system, reference should be made to the co-pending application Ser. No. 12/363,866, the disclosure of which is incorporated herein by reference. That application is also assigned to Belanger, Inc. As described in that application, the rollers 46 can rotate relative to the shaft and individually relative to one another and have enough frictional engagement with the support shaft to turn with it when the shaft is incrementally rotated by a linear actuator 56. Each actuator stroke causes incremental rotation on the order of 90° such that fresh roller surfaces are available for the tire application process for each vehicle being treated.

To the left end of the structure 12 as shown in FIG. 1 is a steel or aluminum frame 50 which carries an angled elastomeric tire guide 52 which is flared outwardly so as to diverge away from the designated path of travel represented by center line 10. The function of the tire guide 52 is to capture the front edge of a tire advancing toward the structures 12, 14 and cause displacement of the structure 12 as necessary to accommodate any misalignment of the approaching vehicle relative to the center line of the path of travel 10. The guide 52, in combination with the pivots, 24, 26, 28, 36 and the air cylinders 30.

The term "misalignment" as used herein, refers not only to a situation wherein the center line of the vehicle is parallel to but not co-located with the center line 12 as well as situations wherein the center line of the vehicle crosses the center line 10 at an angle, the latter also being referred to as misorientation. Finishing tip the details of the upper unit 12, it comprises limit stop bumpers 54, 58 as well as the aforementioned linear actuator 56 to rotate the rollers 46 during use. Whereas the actuator 44 is grounded to the plate 18, the actuator 30 is simply connected between the two arm portions 20, 22. The actuator cylinders 30, 44 function as passive springs but are also powered to advance and retract the structure 12 as desired.

Figure 2:
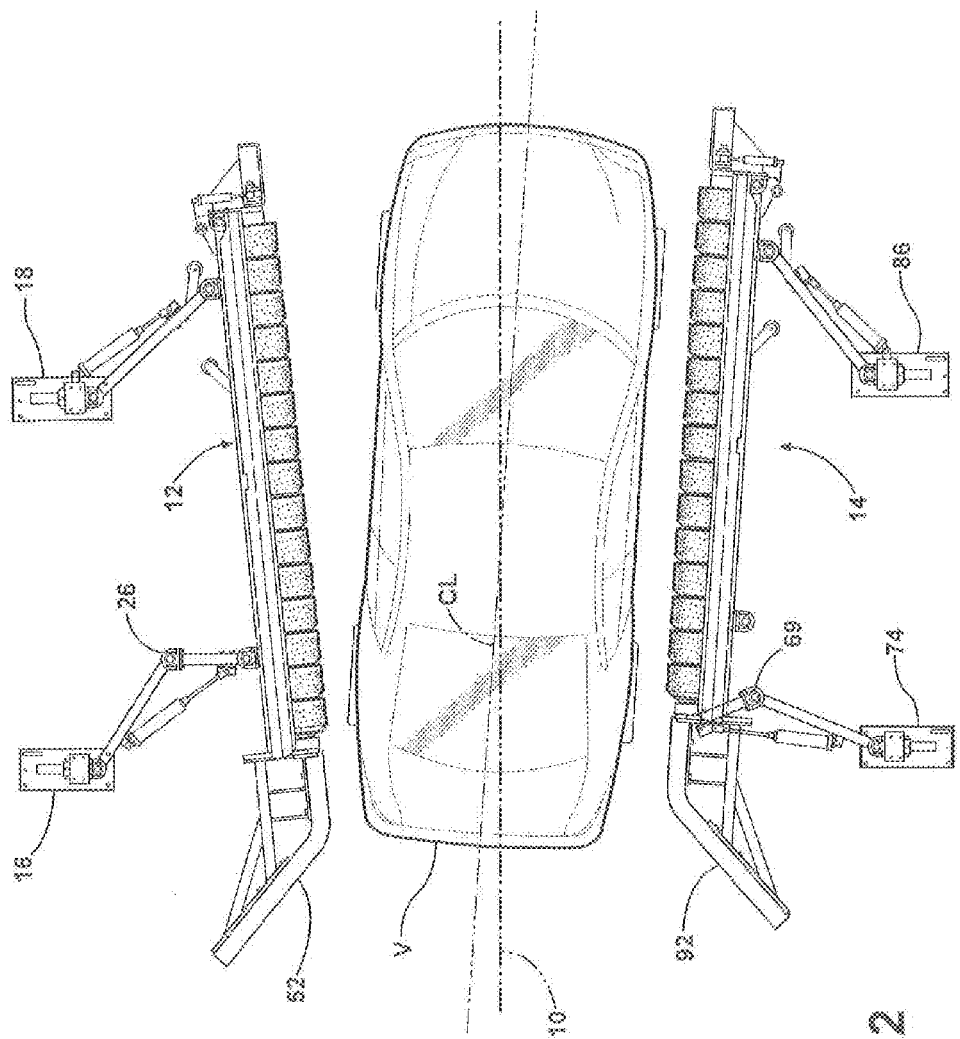
FIG. 2 is a plan view of the station as shown in FIG. 1 but with a misaligned vehicle in the system but with the wheel treatment devices retracted.

It can be seen that, while the upper unit 12 is located at an angle relative to the geometric center line 10 of the system and converges toward the center line at the entry end of the system, the knuckle or pivot 28 between the arm portions 20, 22 allows the arm system 20, 22 to collapse, shortening the distance between the pivots 24, 26 with no change or orientation in the arm 32. The entire structure 12 can move up and to the right as shown in FIG. 1 to accommodate a wider vehicle and then move back toward the armed position shown in FIG. 1 after the vehicle has passed. The knuckle 26 allows the center line axis of the rollers 46 to align itself with the plane of the sidewalls of the tires of the vehicle being treated at any given tune as shown in FIG. 2. The entire structure 12 can be pulled out of the contact position of the dressing application option is not selected.

In a practical system, the center line of the roller applicators 46 is approximately 8 inches off of the ground making the lower ends of the rollers 46 approximately 4 inches off the ground. It is desirable to make the carriage 42, the arms 20, 22 and 32, and the frame 50 out of lightweight aluminum as the entire structure 12 shown in FIG. 1 is cantilevered out from the bolted-down floor plates 16, 18. Casters may be added to carriage 43 if desired.

The lower structure 14 as shown in FIG. 1 is essentially mirror-image identical to the structure 12. A series of foam plastic rollers 62 is mounted on a shaft (not shown) supported by an elongate carriage 60. Tire dressing is applied to the outside surfaces of the rollers through a distribution system which is connected to a supply system as described in the aforementioned co-pending application Ser. No. 12/363,866.

A first set of support arms 66, 68 is connected by pivots 70, 72 to a bolted-down floor plate 74. A center knuckle 69 allows the arm system between pivots 70, 72 to collapse in the same manner as the arm system 20, 22 in the upper structure 12. As shown in FIG. 1, the vehicle is misaligned so that it will contact a guide 92 as it enters the dressing applicator system. The knuckle 69 will take up the entry contact shock as required. Air cylinder 76 is connected between the two arms 66, 68 in the same manner as air cylinder 30 is connected between the arms 20, 22. Cylinder 76 acts as a damper/spring to absorb shock force and permit reorientation of structure 14.

On the right side of the structure, a single rigid support arm 78 is connected between pivots 80, 82 on the carriage 60 and the floor plate 86, respectively. Air cylinder 84 is connected between the arm 78 and the floor plate standard 86 so as to ground the right side of the structure 14 in the same manner as the right side of the structure 12 is grounded by floor plate 18. Limit stop bumpers 88, 92 are provided for purposes which will be apparent to those skilled in the art. A linear actuator 90 provides for incremental rotation of the roller applicators 62 between vehicles.

An aluminum carriage 94 mounted by bolts to the left side of the structure 14 carries a low friction, angled elastomeric guide 92 which is located approximately 4 inches off the ground to capture the front tire of a vehicle approaching the tire dressing station and to cause deflection or reorientation of the structure 14 as necessary to accommodate the vehicle within the system.

Figure 3:
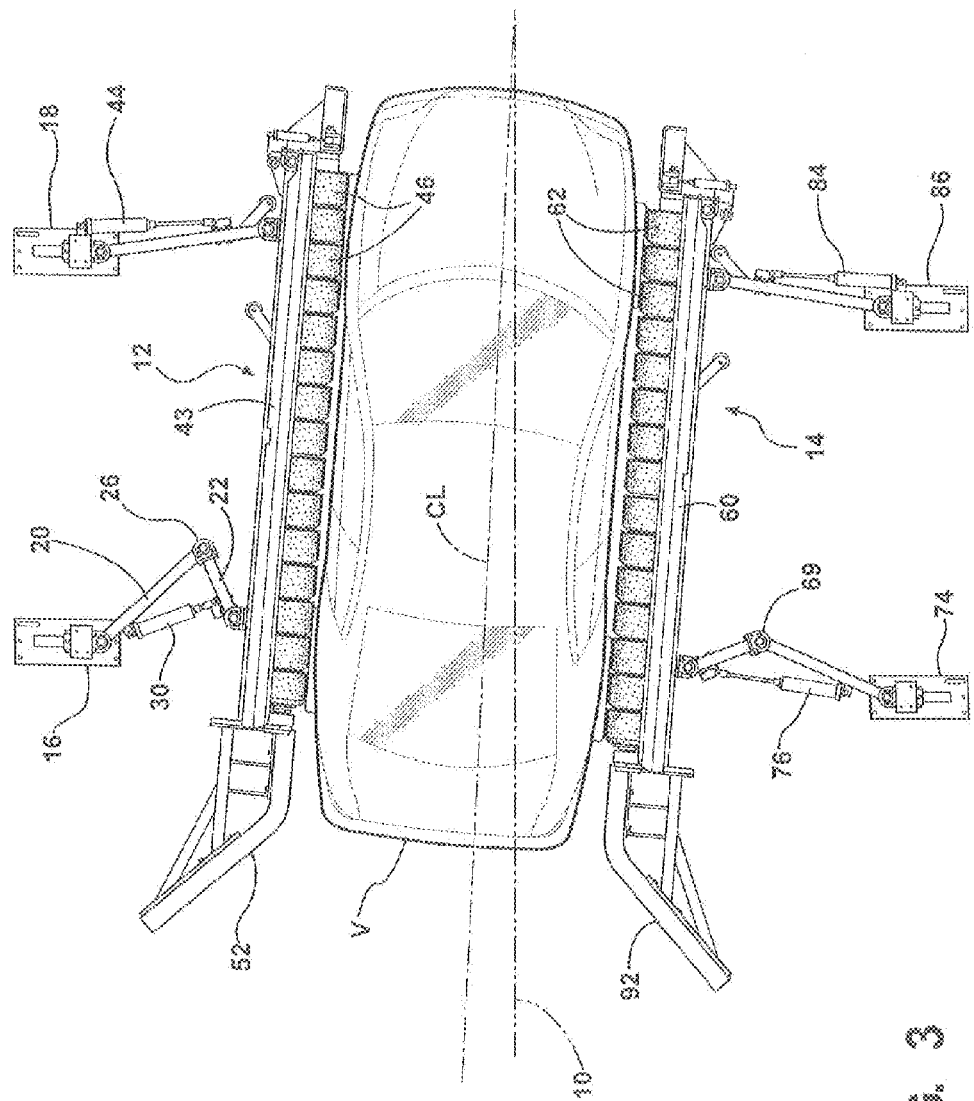
FIG. 3 is a plan view of the FIG. 1 system with the treatment devices in full vehicle contact.

FIG. 2 shows an example of how the structures 12, 14 can be spread apart to effectively disengage the system. Even then, a seriously misaligned vehicle can hit one of the guides 52, 92 and the knuckles 26, 69 help absorb shock according to which side of the system the vehicle hits first. FIG. 3 shows how the structure 12, 14 reorient themselves as necessary to accommodate a vehicle V which is fully entered into the system but with the center line CL of the vehicle misaligned by approximately 5° with the center line 10 of the system. To accommodate this misalignment, the lower unit 14 remains approximately in the same position as it occupied in the armed position shown in FIG. 1 but the upper structure 12 has deflected upwardly and to the right relative to the position shown in FIG. 1. The arms 20, 22 have collapsed considerably such that the outside surfaces of the rollers 46 are now in full engagement with the tires of the vehicle while the rollers 62 on the other side of the station are in full engagement with the outside sidewalls of the right side tires of the vehicle. It will be understood that this is but one example of vehicle misalignment accommodation. Practical testing has shown that the system accommodates various other misalignments and misorientations in varying degrees.

In operation, the structures 12, 14 are set to the "armed" position shown in FIG. 1 in advance of the entry of a vehicle to be treated. In this position, the structures 12, 14 converge at the entry end to a width between the tire guides 52, 92 of about 4½ feet. The actuators 56, 90 are operated to distribute dressing over the rollers as is more fully described in the co-pending application Ser. No. 12/363,866. The leading tire edge or edges contact one or both of guides 52, 96 to resiliently urge the structures 12, 14 apart such that the vehicle may pass between them. Dressing is applied to the sidewalls of all four tires. After the vehicle passes, the system may return to the armed position or be retracted out of the way.

It will also be understood that the invention has been described with reference to only one arrangement which permits angular movement and overall translation of the roller structures relative to a misaligned vehicle. While this is the preferred embodiment of the invention at the present time, there are other arrangements which can be used. For example, fixed, non-collapsing arms can be used on both sides of the station to provide pure rectilinear translation of a longitudinal bar in and out relative to the center line 10 to define rest and armed positions. The applicators may be attached to the bar by a center pivot between the mounting structure. A roller carriage can be provided to allow the entire system to pivot relative to the support structure as necessary to accommodate vehicle misalignment. However, this adds considerable cantilevered weight and may require the, use of floor engaging rollers on the bottoms of the roller carriages to prevent bending of the support arms. It is the intent of the applicants that the appended claims cover not only the illustrated embodiment but alternatives and equivalents thereof as well.

As stated above, the invention can also be used in systems other than tire dressing applicators. For example, a knuckle-like intermediate pivot 28 in the present system can be placed into the forward parallelogram arm 22 of the system shown in U.S. Pat. No. 5,127,123 which uses cloth disks to clean vehicle wheels.

What is claimed is:

1. A tire dressing application device comprising:
    an elongate dressing applicator structure adapted to transfer tire dressing by contact to the sidewalls of vehicle tires;
    an elongate carriage for said applicator structure; and
    a positioning structure connected to said carriage for orienting the applicator structure in an armed position which is nonaligned with a vehicle travel path;
    wherein said positioning structure comprises a pair of pivot arms, each of said arms having an outer anchored end and an inner end connected to a pivot point along said carriage to form a parallelogram support; and
    wherein said positioning structure includes an additional pivot connected into one of said arms to allow said one arm to collapse to varying degrees whereby said carriage can be oriented in both aligned and non-aligned positions relative to said vehicle travel path.

2. A device as described in claim 1 further including an air cylinder connected across said additional pivot.

3. A tire dressing applicator system for motor vehicles comprising:
    a mirror-image pair of elongate, tire-engaging applicators adapted to carry dressing to tires, said applicators having spaced apart tire entry ends;
    said applicators being arranged to converge toward one another at the vehicle-entry ends; and
    a support structure for allowing the applicators to be resiliently pushed apart by a vehicle and reoriented as necessary to make contact with the tires of said vehicle as it traverses the lengths of said applicators.

4. A tire dressing application system as defined in claim 3 further including diverging tire guide means attached to said entry ends.

5. A tire dressing applicator system for motor vehicles passing along a path of travel in a car wash structure having a floor wherein the applicator system comprises:
    a mirror-image pair of elongate tire-engaging applicators adapted to carry dressing for application to the sidewalls of vehicle tires, said applicators having spaced apart tire entry ends and tire exit ends;
    each said applicators being mounted to said floor by means of a double pivot arm parallelogram support system comprising first arms connected to said applicators nearer the entry ends and second parallelogram arms connected to said applicators nearer said exit ends;
    each of the arms connected to said applicators nearer said entry end having a supplemental pivot connected between the ends thereof to allow said arm to collapse resiliently;
    whereby said applicator can be arranged to normally converge toward one another at the vehicle entry ends but resiliently pushed apart by an entering vehicle to make contact with the tires of said vehicle as it traverses said path of travel.

* * * * *